United States Patent [19]

Penzenstadler et al.

[11] Patent Number: 5,838,114
[45] Date of Patent: Nov. 17, 1998

[54] PLURAL FERRO-RESONANT POWER SUPPLIES FOR POWERING A MAGNETRON WHERE THE ARAY LIES IN THESE POWER SUPPLIES BEING INDEPENDENT FROM EACH OTHER AND NOT UTILIZING ANY COMMON COMPONENTS

[75] Inventors: Ernest G. Penzenstadler, Herndon, Va.; Gungor Aktas, Rockville, Md.

[73] Assignee: Fusion Systems Corporation, Rockville, Md.

[21] Appl. No.: 613,149

[22] Filed: Mar. 8, 1996

[51] Int. Cl.⁶ .................................................. H05B 37/02
[52] U.S. Cl. ........................... 315/277; 315/248; 315/176
[58] Field of Search .................................. 315/176, 171, 315/173, 277, 39.51, 248; 323/248

[56] References Cited

U.S. PATENT DOCUMENTS

| | | | |
|---|---|---|---|
| 3,500,128 | 3/1970 | Liepins | 315/277 |
| 4,001,632 | 1/1977 | Haugsjaa et al. | 315/39 |
| 4,175,246 | 11/1979 | Feinberg et al. | 315/277 |
| 4,189,661 | 2/1980 | Haugsjaa et al. | 315/39 |
| 4,219,760 | 8/1980 | Ferro | 315/248 |
| 4,320,325 | 3/1982 | Anderson | 315/205 |
| 4,739,227 | 4/1988 | Anderson | 315/260 |
| 5,115,168 | 5/1992 | Shoda et al. | 315/39.51 |
| 5,216,333 | 6/1993 | Nuckolls | 315/277 |
| 5,287,039 | 2/1994 | Gregor et al. | 315/248 |

OTHER PUBLICATIONS

Atsuo et al. Japanese English abstract of JP2,044,695 Fan. 8, 1988.

*Primary Examiner*—Robert J. Pascal
*Assistant Examiner*—Michael Shingleton
*Attorney, Agent, or Firm*—Pollock, Vande Sande & Priddy

[57] ABSTRACT

A power supply quickly restarts an electrodeless lamp which is temporarily turned off in an application using microwave radiation generated by a magnetron. When the electrodeless lamp operates in a full power mode, the power supply provides full power to the magnetron via high DC current and high DC voltage. When a user selectively switches the electrodeless lamp off, less power is provided to the magnetron than in the full power mode. In the reduced power mode, the magnetron generates sufficient microwave radiation to maintain the bulb plasma in an ignited condition while the lamp produces substantially no light output. This eliminates the required cooldown delay associated with the lamp shut down and quickly brings the lamp to the full power operation when requested by the user.

5 Claims, 7 Drawing Sheets

5,838,114

PLURAL FERRO-RESONANT POWER SUPPLIES FOR POWERING A MAGNETRON WHERE THE ARAY LIES IN THESE POWER SUPPLIES BEING INDEPENDENT FROM EACH OTHER AND NOT UTILIZING ANY COMMON COMPONENTS

FIELD OF THE INVENTION

The present invention relates to power supplies and, in particular, a power supplying system for a magnetron for quickly restarting a microwave powered electrodeless lamp after it has been temporarily switched off.

BACKGROUND OF THE INVENTION

It is known to use microwave powered electrodeless lamps in ultraviolet exposure or visible lighting applications. Some of these applications may require turning off the lamp occasionally for a relatively brief period of time. In addition, such interruption may be needed for troubleshooting or maintenance procedures in order to perform the necessary repairs or adjustments. To stop the lamp from producing optical emission, the power to the magnetron is interrupted in order to remove the microwave field from the bulb.

For most heating or curing applications, the power to the magnetron cannot be turned OFF and then ON shortly thereafter. As known in the art, plasma is a completely ionized or excited gas contained inside the bulb and created due to application of a microwave field. This ionization of gas, i.e., the plasma, is accompanied by UV radiation or visible light, as well as very high temperature and pressure inside the bulb during its normal full power operation. If, due to some necessity, the lamp must be temporarily switched off, the plasma extinguishes. The high pressure, however, remains inside the hot bulb and prevents easy initiation of the plasma immediately thereafter. Therefore, the restart of the lamp must be delayed because the bulb must cool down—the fill must be allowed to condense thereby lowering the pressure inside the bulb—before returning to the full operating mode.

The so-called round trip time starting from the lamp ON state, going to the OFF state, waiting for the cooldown to end and then returning back to the full operating mode lamp ON state may be significant depending on the bulb type. For example, the cooldown delay may be 18 seconds which certainly slows down the process in the UV application. In addition, the rise time of the lamp to the full power, i.e., how quickly the lamp reaches approximately the full power, may be somewhat slow from a cold start, for example, following the cooldown delay.

U.S. Pat. No. 5,287,039 to Gregor et al. (hereinafter Gregor) addresses the problem of hot restarting an electrodeless lamp. Gregor describes a method and apparatus for modulating the microwave power between on and off states at megahertz frequencies while a duty factor is gradually decreased. Thus, prior to shutting off the lamp completely, the microwave power delivered to the lamp is interrupted at a frequency. During the interruption, the microwave power delivered to the lamp is zero. As the interruption period is increased and the lamp-on time is decreased, the lamp cools. The lamp cooldown, therefore, allows a quick restart during this shut-down phase if the continuous microwave power output is re-established.

Although the patent provides a quick restart of the lamp, its ON-OFF method very closely resembles a shutter operation and may be unsuitable for certain types of lamps and/or applications. The interruption of microwave power coupled with increasingly smaller duty factors may not be used in certain bulbs.

In addition, there is a normal start-up delay, i.e., the rise time, associated with a cold start. The start-up delay to achieve substantially the full power is very disadvantageous in certain types of UV applications, for example.

A need, therefore, exists for a system which quickly restarts an electrodeless lamp without the required cooldown delay, improves the rise time to full power, and eliminates the above disadvantages associated with the prior art.

SUMMARY OF THE INVENTION

It is therefore an object of the present invention to quickly restart an electrodeless lamp, which has been temporarily switched off, without interrupting power to the lamp.

It is another object of the present invention to substantially eliminate the cooldown delay associated with the restarting operation of the electrodeless lamp which has been temporarily switched off.

It is yet another object of the present invention to improve the rise time of the lamp to full power as compared to a cold start or standby mode.

These and other objects, features and advantages are accomplished by a power supplying system for a magnetron which quickly restarts an electrodeless lamp, being temporarily turned off, without requiring the cooldown delay, and improves the rise time of the lamp to full power.

In accordance with one aspect of the present invention, relatively high power is supplied to the magnetron in a full power mode. Upon selective switching from this mode, without interruption, relatively lower power, which is of magnitude to generate sufficient microwave radiation to maintain the lamp in an ignited condition, is supplied to the magnetron. In the preferred embodiment, the power supplying system includes a high power, power supply which supplies relatively high DC current and high DC voltage, and a low power, power supply which supplies relatively low DC current and substantially the same high DC voltage. When the electrodeless lamp operates in a full power mode, two power supplies supply the combined DC current and high DC voltage to the magnetron. When the electrodeless lamp is temporarily switched off from the full power mode, the high power, power supply is turned off. This leaves the low power, power supply to supply low DC current and substantially the same high DC voltage to the magnetron, providing less power than in the full power mode. In the reduced power mode, the bulb plasma remains in an ignited condition, which eliminates a cooldown delay and enables a quick restart of the lamp when the full power is applied.

In accordance with another aspect of the present invention, the high power section includes a microcontroller, a relay controlled by the microcontroller for selectively preventing the high power section from providing power to the magnetron, at least one transformer for stepping up the input voltage, and a voltage multiplier connected to the transformer for further increasing and rectifying the stepped up voltage.

In accordance with a further aspect of the present invention, the low power section includes a relay controlled by the microcontroller for selectively disconnecting input power to the power supply, at least one transformer for stepping up the input voltage, a voltage multiplier connected to the transformer for further increasing and rectifying the stepped up voltage.

In accordance with yet a further aspect of the present invention, an inductor connected to the voltage multiplier is provided for keeping a magnetron current above a predetermined threshold level.

BRIEF DESCRIPTION OF THE DRAWINGS

The above-mentioned as well as additional advantages and features of the present invention will be evident and more clearly understood when considered in conjunction with the accompanying drawings, in which.

Figure 1:
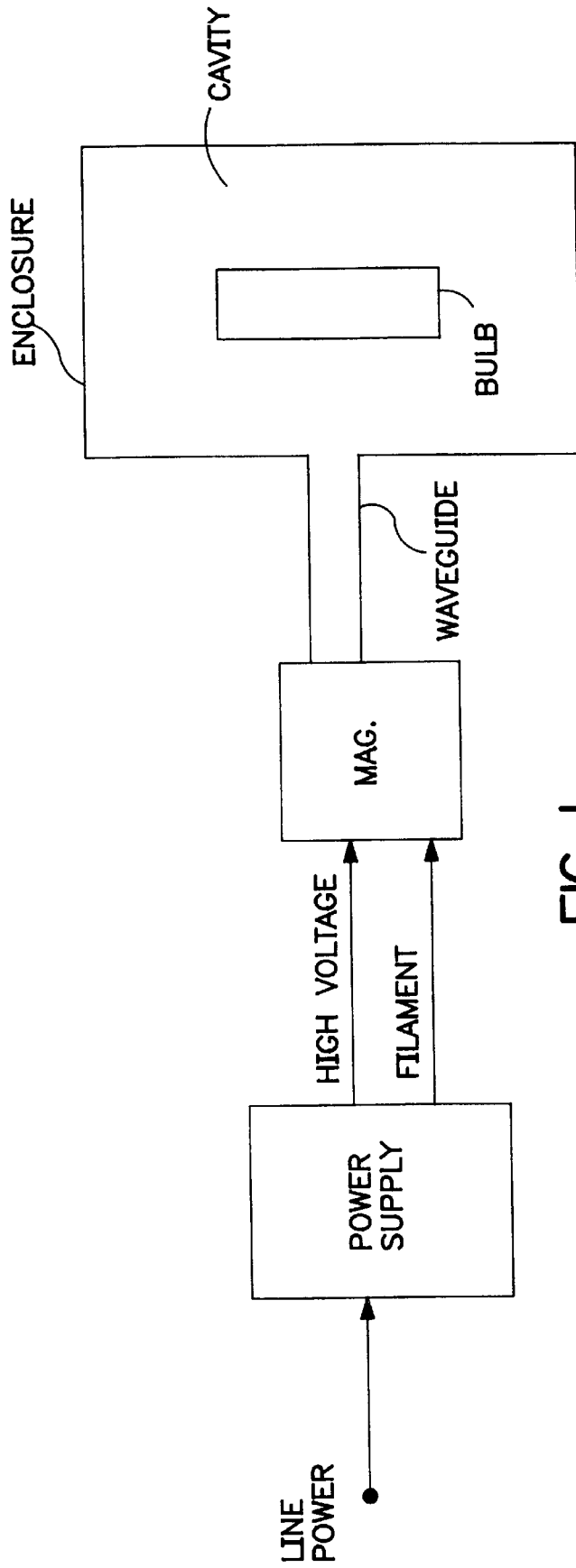
FIG. 1 shows a block diagram of a microwave powered electrodeless lamp.

In all Figures, equivalent reference numerals represent the same or identical components of the present invention.

DESCRIPTION OF THE PREFERRED EMBODIMENTS

FIG. 1 shows a block diagram of a power supply providing power to a magnetron which generates a microwave field to excite a filled bulb in an ultraviolet curing application. As stated earlier, plasma within the bulb results from the continuous microwave exposure. This is accompanied by optical emission, such as UV radiation or visible light, from the bulb.

As previously described, as soon as the power to the magnetron is terminated, the plasma extinguishes. Restarting the bulb plasma then becomes extremely difficult and time consuming, requiring a significant waiting period to allow for the bulb to cool down and the fill to condense.

To accelerate the restarting operation of the lamp shortly after switching off the full power, a Quick Restart Option (QRO) mode has been implemented in accordance with the present invention. Thereby, a user or operator has the option of restarting the lamp at any time without the cooldown delay associated with the condensation of the fill after the lamp output has been decreased from the full power. In this QRO state, in which virtually no light or UV radiation is produced, the bulb is always ready for a continuous full power operation.

Figure 2:
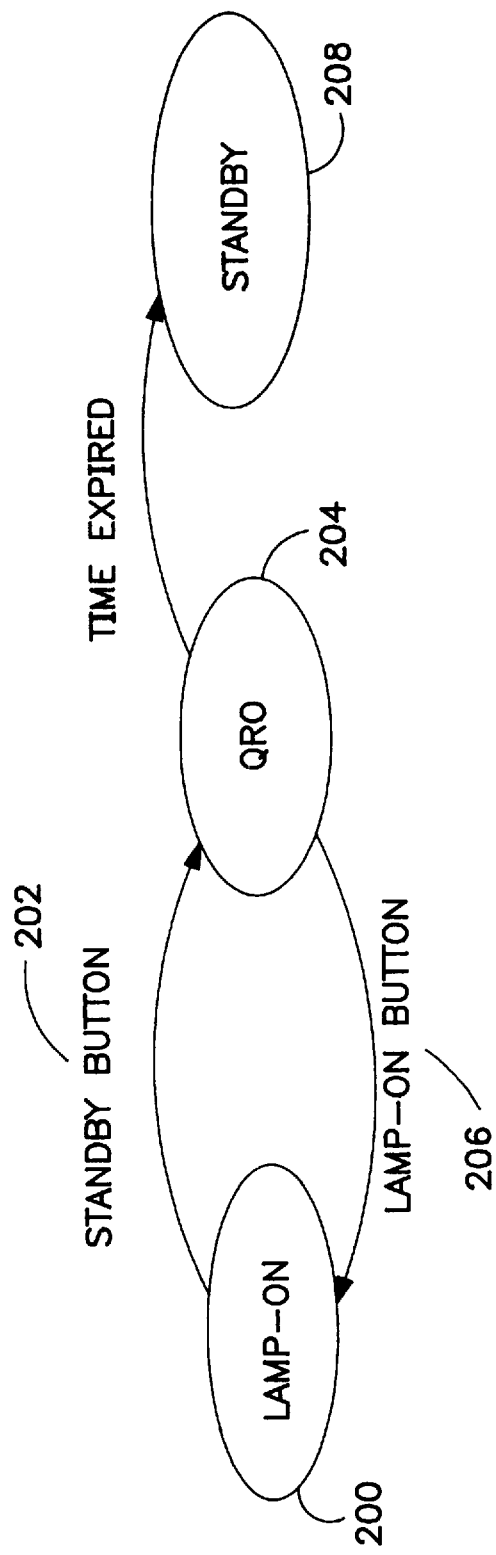
FIG. 2 shows a state diagram for the Quick Restart Option (QRO) operation in accordance with one embodiment of the present invention.

FIG. 2 shows a state diagram for the QRO operation in accordance with one embodiment of the present invention. When the lamp is operating at full power, i.e., a LAMP-ON state 200, and a quick stoppage is required, the operator activates a Standby button 202 either remotely or on the front panel of the power supply. In response to the activation of the Standby button 202, a microcontroller activates the QRO state 204. In this state, substantially the same voltage is provided to the magnetron as during its full power operation, i.e., the LAMP-ON state 200. The DC current to the magnetron, however, is significantly reduced by a factor of approximately 10. As a result of receiving the high voltage and relatively low current, the bulb plasma stays in the ignited condition, i.e., "simmering", producing virtually no output radiation, and is prevented from extinguishing. In this state, the light output level of the lamp is reduced to approximately 1% of the full light output level.

If the operator desires to immediately turn the full power back on, he activates a Lamp-on button 206 either remotely or on the front panel of the power supply. The lamp is then instantaneously restored to its full power operation. Due to the QRO state 204, the restart waiting period is virtually eliminated because the lamp cooldown is not required. Thus, the operator has the option of quickly restoring the heating or curing process. If the operator does not activate the Lamp-on button 206 within a predetermined time period, such as approximately 40 seconds, a STANDBY mode 208 is entered. In this mode, no high voltage is supplied to the magnetron. Once the STANDBY mode 208 is activated, the lamp may be restarted without an additional delay time since, by this time, the lamp has sufficiently cooled down, and the pressure in the bulb is low enough to allow a normal restart.

The present invention is described in more detail below with reference to FIG. 3. From a "cold start" in order to effect the continuous power operation, an ON/OFF switch 300 (which, in one embodiment of the invention, may include two separate switches: one for OFF and one for ON) starts the initial operation of the magnetron 302 and the bulb (not shown). A microcontroller 320 senses the initial activation of the ON/OFF switch 300 and energizes a mechanical relay assembly 306. A line power 304 ranging from 200–240 VAC is coupled through the mechanical relay assembly 306. Responding to a signal from the microcontroller 320, the mechanical relay assembly 306 switches the line power 304 either ON or OFF to the primary power supply circuit and the auxiliary power supply circuit, as explained below.

The line power 304 then proceeds through the two power supplies: a high power supply and a low power supply. The high power supply includes transformers 310, a voltage multiplier 312, and a solid state relay assembly 308, which is controlled by the microcontroller 320 in response to a signal from a STANDBY switch 322. The low power supply includes a transformer 314, a voltage multiplier 316, and a choke 324. Control circuitry for the power supplies includes microcontroller 320 and relays 308 and 306.

The line power 304 is supplied to the high voltage plate transformers 310 via the solid state relay assembly 308 which is energized during the continuous power operation, i.e., the LAMP-ON mode. In accordance with a predetermined ratio, the transformers 310 step up or increase the line voltage to a high value of approximately 2000 VAC. After the increase, the voltage multiplier 312 further doubles the voltage to approximately 4000 V, while additionally converting it to DC. Thus, the output from the high power supply is 4000 VDC, tapped at approximately 630 mA into an adding junction 318.

Figure 3:
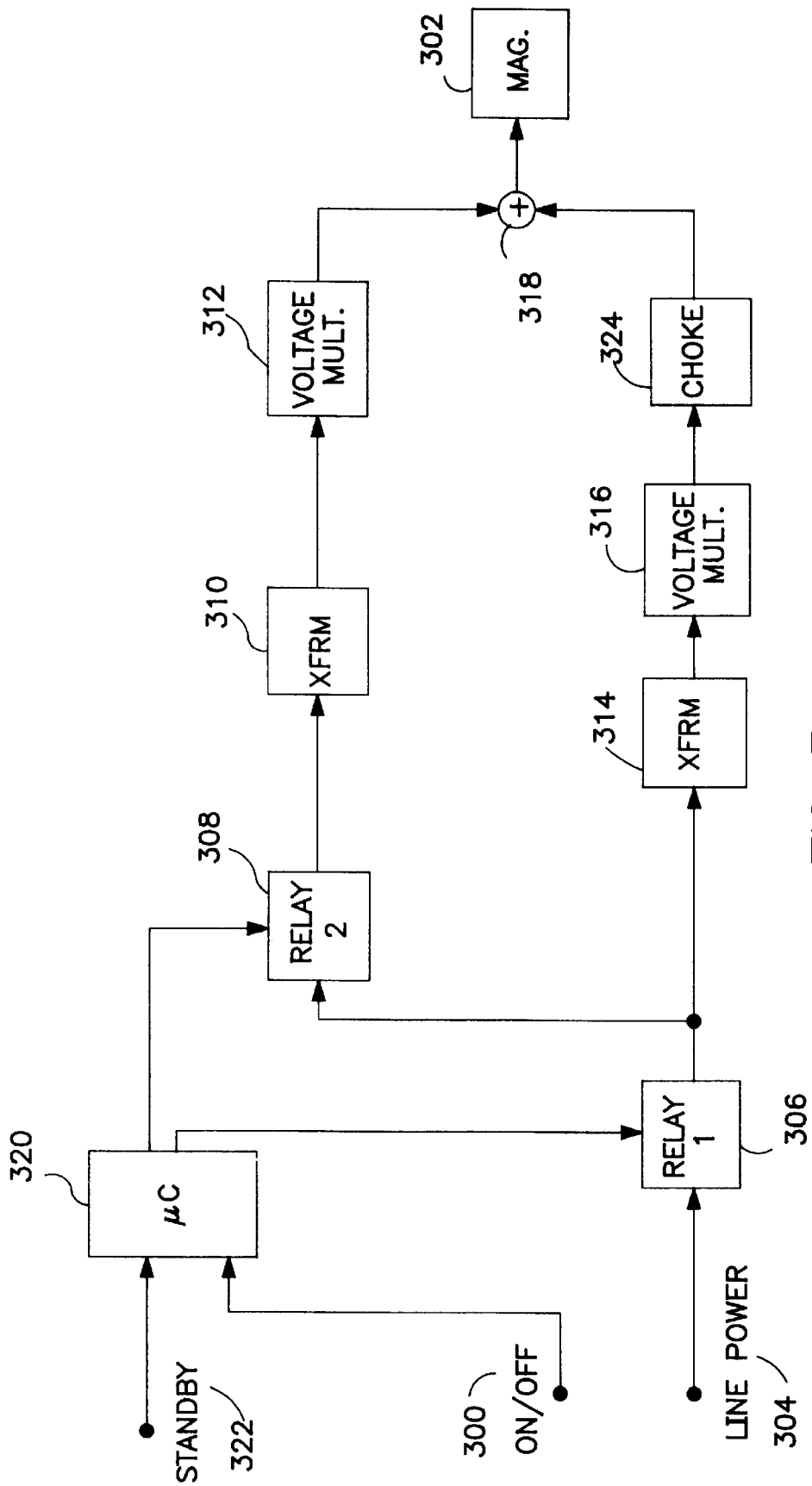
FIG. 3 shows a general block diagram of the power supply in accordance with one embodiment of the present invention.

As shown in FIG. 3, the line power 304 also proceeds through the transformer 314 of the low power supply, which steps up the line voltage to 2000 VAC. This voltage is then doubled and rectified by the voltage multiplier 316. The output from the low power supply is also 4000 VDC, but tapped at much lower current of about 65 mA. This current is then fed through an inductor, such as the choke 324, for reducing a ripple as a result of a 60–Hz line frequency, and into the adding junction 318.

The two currents from the high and low power supplies are combined at the adding junction 318 to supply 4000 VDC at approximately 695 mA to the magnetron 302.

Figure 4:
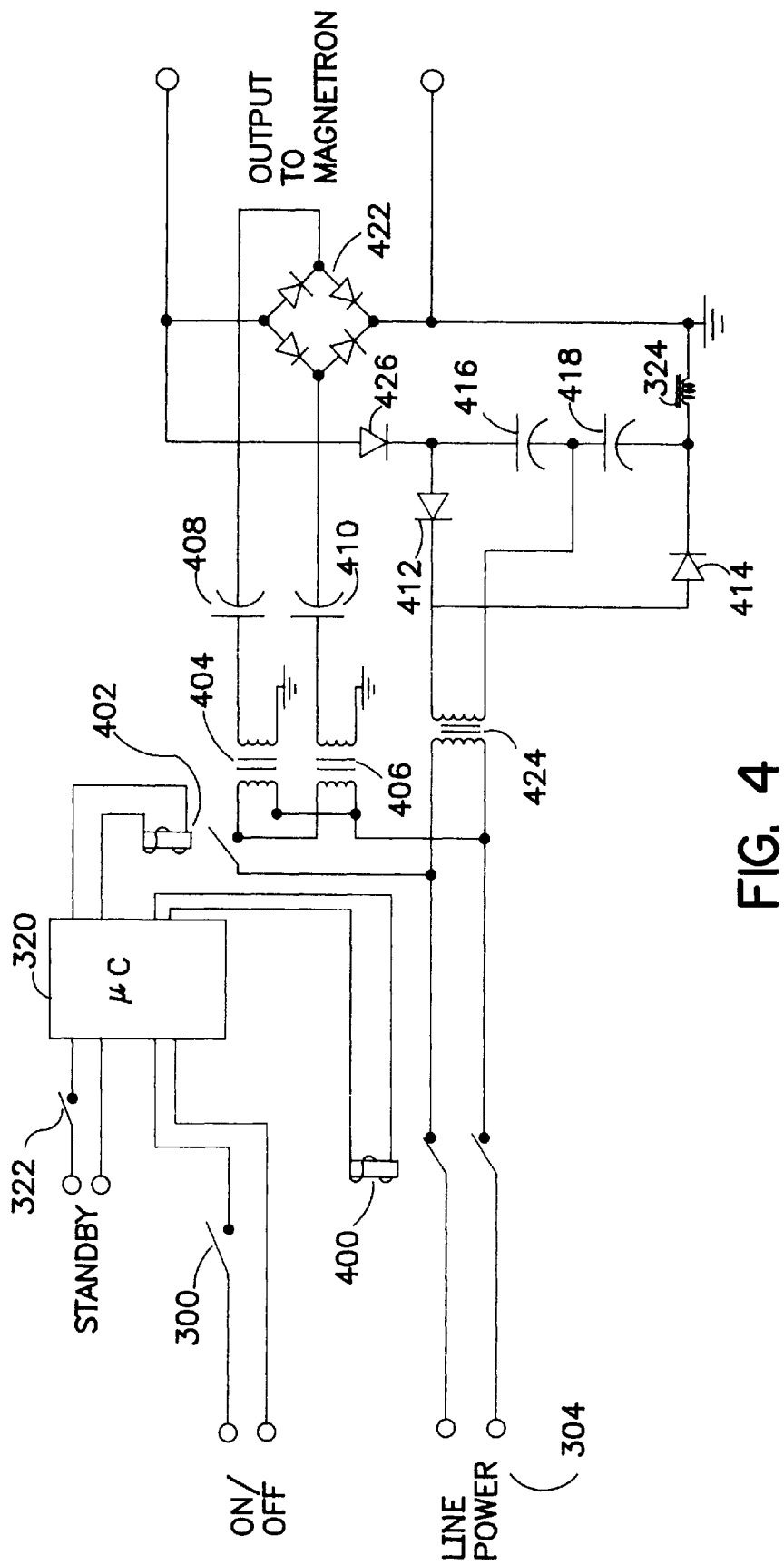
FIG. 4 shows a detailed schematic diagram of the power supply in accordance with one embodiment of the present invention illustrated in FIG. 3.

More specifically, a schematic of an embodiment of the present invention is shown in FIG. 4. The ON/OFF switch 300 is responsive to an activation by an operator. An output signal from the switch 300 serves as an input signal to the microcontroller 320 which controls a relay 400. The relay 400 may be a mechanical relay for isolating high voltage signals, as known in the art. As shown in FIG. 4, the line power 304 is controlled by the relay 400. When the operator activates the switch 300, the microcontroller 320 sends a signal to the relay 400 which closes its contacts. As a result of the energized, closed-contact state of the relay 400, the line power 304 can flow to transformers 404, 406 and 424.

The line power 304 provided to the two transformers 404 and 406 is controlled by a relay 402 which is controlled by the microcontroller 320. The relay 402 may be a solid state relay for isolating high voltage signals, as known in the art. The microcontroller 320 sends a signal to energize the relay 402 at the power-up, keeping it energized during the continuous operation in the LAMP-ON mode.

If the operator activates the STANDBY switch 302, then the microcontroller 320 responds by providing a de-energizing signal to the relay 402 to open its contacts. This disconnects the line power 304 from the high power supply. Also upon activation of the STANDBY switch 302, the microcontroller 320 starts the time-out period, which may be approximately 40 seconds. Upon expiration of this period, the lamp will terminate the QRO state and enter the STANDBY mode. At this time, the relay 400 will then open its contacts, shutting off power to the transformer 424. This, in turn, removes all power from the magnetron.

Continuing with the description of the present invention in accordance with FIG. 4, the line power 304 is increased by high voltage transformers 404, 406 and 424 during the continuous power operation. The transformers 404, 406 and 424 are ferro-resonant, step-up transformers for increasing the input voltage in accordance with a predetermined ratio. The transformers 404 and 406 and two capacitors 408 and 410, respectively, are tuned into a resonant circuit in the high power supply. The capacitors 408 and 410 are connected to diodes, arranged in a bridge configuration 422, such that AC voltage is converted to DC, and the resulting DC voltage is doubled. As known in the art, the voltage multiplying circuit is two or more peak rectifiers that produce a DC voltage from the input AC voltage. The output DC voltage is substantially equal to a multiple of the peak input voltage. In the current embodiment, the voltage multiplier which includes the two capacitors 408, 410 and the diode bridge 422 is configured as a voltage doubler, which rectifies the input AC voltage and increases it by approximately a factor of 2.

While the high power supply supplies relatively high DC voltage and current to the magnetron 302 during the continuous power operation in the LAMP-ON mode, the low power supply also provides high DC voltage but substantially less current to the magnetron 302. As part of the low power supply, the transformer 424 steps up the line voltage 304 to the high voltage of approximately 2000 V. This voltage is then doubled using rectifying diodes 412, 414 and capacitors 416, 418 in a configuration known as a voltage doubler.

The voltage doubler includes a pair of diodes 412, 414 where a cathode of one diode is connected to an anode of the other diode. Each diode 412, 414 has the corresponding capacitors 416 and 418, respectively. The capacitors 416 and 418 are connected in such a way that the accumulated electrical charges are in series with each other. Doubling of the voltage is thus achieved.

An inductor, such as the choke 324, is used as an energy storage device to prevent the magnetron current from dipping below a predetermined threshold level. Since the voltage across an inductor increases proportionally with the rate of change of current through it, the choke 324 will supply additional current, acting as an energy storage device, if substantial current swings below the predetermined threshold level or a ripple occurs after the AC rectification. In one embodiment of the present invention, the exemplary current threshold was set at 30 mA at 60 Hz line frequency. The choke 324 was then appropriately selected to maintain the magnetron current above this threshold level. As long as the magnetron current stays above this exemplary 30 mA threshold level, the plasma is stable and prevented from being extinguished. If the magnetron current drops below the predetermined threshold level, the plasma cannot be sustained in the ignited condition and extinguishes immediately thereafter.

In another embodiment of the present invention, the ripple reducing inductor may be incorporated into the secondary winding of the transformer in the low power supply. Thus, the transformer 424 may be selected in such a way as to combine, into a single unit, its function of stepping up the voltage and the function of the choke 324 to keep the magnetron current above the predetermined threshold level.

A diode 426 acts to isolate the two power supplies circuits from each other. The output current of the voltage doubler from the low power supply is added to the output current from the high power supply to constitute the total output current supplied to the magnetron 302.

To summarize, during the continuous operation of the magnetron 302 and the lamp, the line power 304 is supplied to the pair of transformers 404, 406 via the energized relay 402 with its contacts closed. The input voltage at the primary windings of the transformers 404, 406 is stepped up in accordance with a predetermined ratio. Connected in the secondary windings of each transformer 404, 406 are capacitors 408, 410. Each capacitor 408, 410 corresponds to the transformers 404, 406, respectively. The capacitors 408, 410 are then connected in series with the bridge rectifier 422. The connections to the bridge rectifier 422 are made so that the electrical charges stored by the capacitors 408, 410 are combined to act in concert with each other. The bridge rectifier 422 converts AC voltage to DC voltage.

The output of the high power supply is then combined with the output of the low power supply. The transformer 424 in the secondary power supply increases the line power 304 by a predetermined ratio. The stepped-up voltage is then doubled and rectified by a combination of capacitors 416, 418 and diodes 412, 414. The total output from the two power supplies results in the high DC voltage with current which is adequate for a full operation of the lamp, i.e., LAMP-ON mode. While both sections output high voltage to the magnetron, the current supplied by each varies by approximately a factor of 10. The representative DC voltage may be approximately 4000 V, while the DC current is the combined 695 mA, where the high power supply contributes 630 mA and the low power supply contributes 65 mA.

If the operator desires to temporarily suspend the operation of the lamp in order to service the equipment or perform the required maintenance without completely shutting off the lamp and wasting time on the cold start, he or she activates the STANDBY switch 322 for invoking the QRO mode. The microcontroller 320 senses a signal from the operator's triggering of the STANDBY switch 322 and, in response, de-energizes the solid state relay 402. By disengaging its contacts, the solid state relay 402 turns off the high power supply which includes the transformers 404, 406, the capacitors 408, 410 and the bridge rectifier 422. This leaves only the low power supply section fully operational.

As previously stated, the low auxiliary power supply supplies the same high voltage as the high power supply, but much lower current. By having small current flowing to the magnetron 302, the plasma inside the bulb is maintained in the ignited state due to partial microwave radiation. In this mode, the lamp can be restarted at any time without the otherwise required cooldown delay.

The restart time from the QRO state varies in accordance with the duration of the operation of the low power supply. The longer the low power supply stays on, the longer may be the restart time.

Figure 5A:
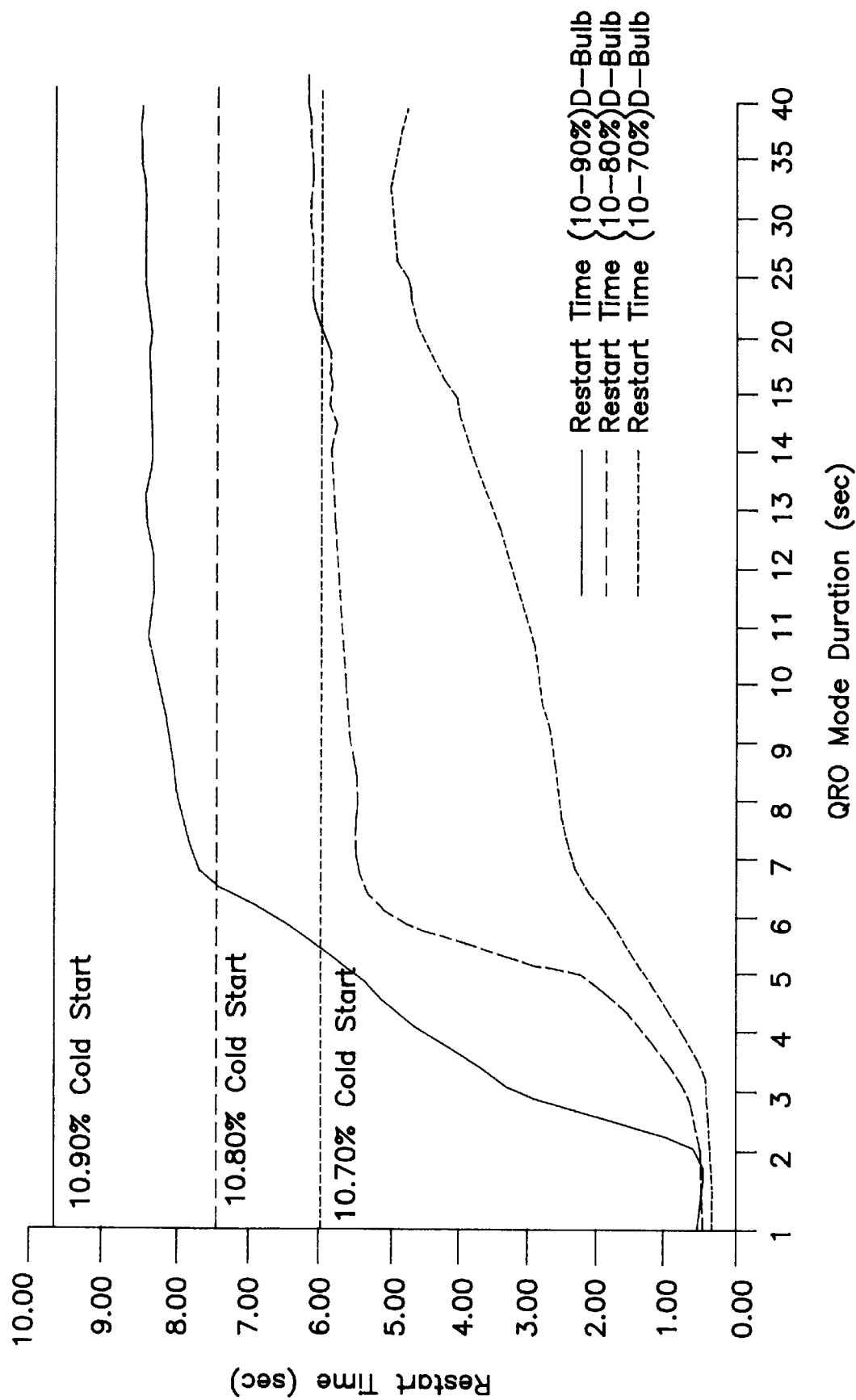
FIG. 5A shows representative graphs of the restart time for the cold start, and the restart time versus the QRO mode duration for a D-type bulb (commercial designation of the assignee, Fusion Systems Corporation employed in curing applications.

The graphs in FIG. 5A graphically illustrate the aspect of the present invention dealing with the bulb's rise time to nearly the fall light output level. The graphs indicate that the QRO mode achieves a shorter start-up delay time than the normal start-up delay required by the cold start or standby mode. For example, for a D-type bulb (commercial designation of the assignee, Fusion Systems Corporation, the restart time from the cold start takes more than 9.5 seconds to achieve 90% of the full light output level. In contrast, using the QRO mode, the restart time is less than 0.5 seconds for the 90% light output level if the full power mode is activated within 2 seconds of the temporary shutdown. FIG. 5A also shows that the QRO start-up delay is always shorter than the required start-up delay of the cold start.

Similarly, about a 7.5 second start-up delay of the cold start is required to obtain 80% of the full light output level, as shown in FIG. 5A. In contrast, the QRO restart time is less than 0.5 seconds if the LAMP-ON button is pressed within about 3 seconds while in the QRO mode. The worst case scenario for the QRO restart time is little more than 6 seconds.

FIG. 5A also shows that the restart time from the cold start is 6 seconds to achieve 70% of the full light output level. The QRO restart time, on the other hand, is less than 0.5 seconds if the full power mode is activated within about 4 seconds of the temporary shutdown. The QRO start-up delay never exceeds 5 seconds, as shown in FIG. 5A.

Figure 5B:
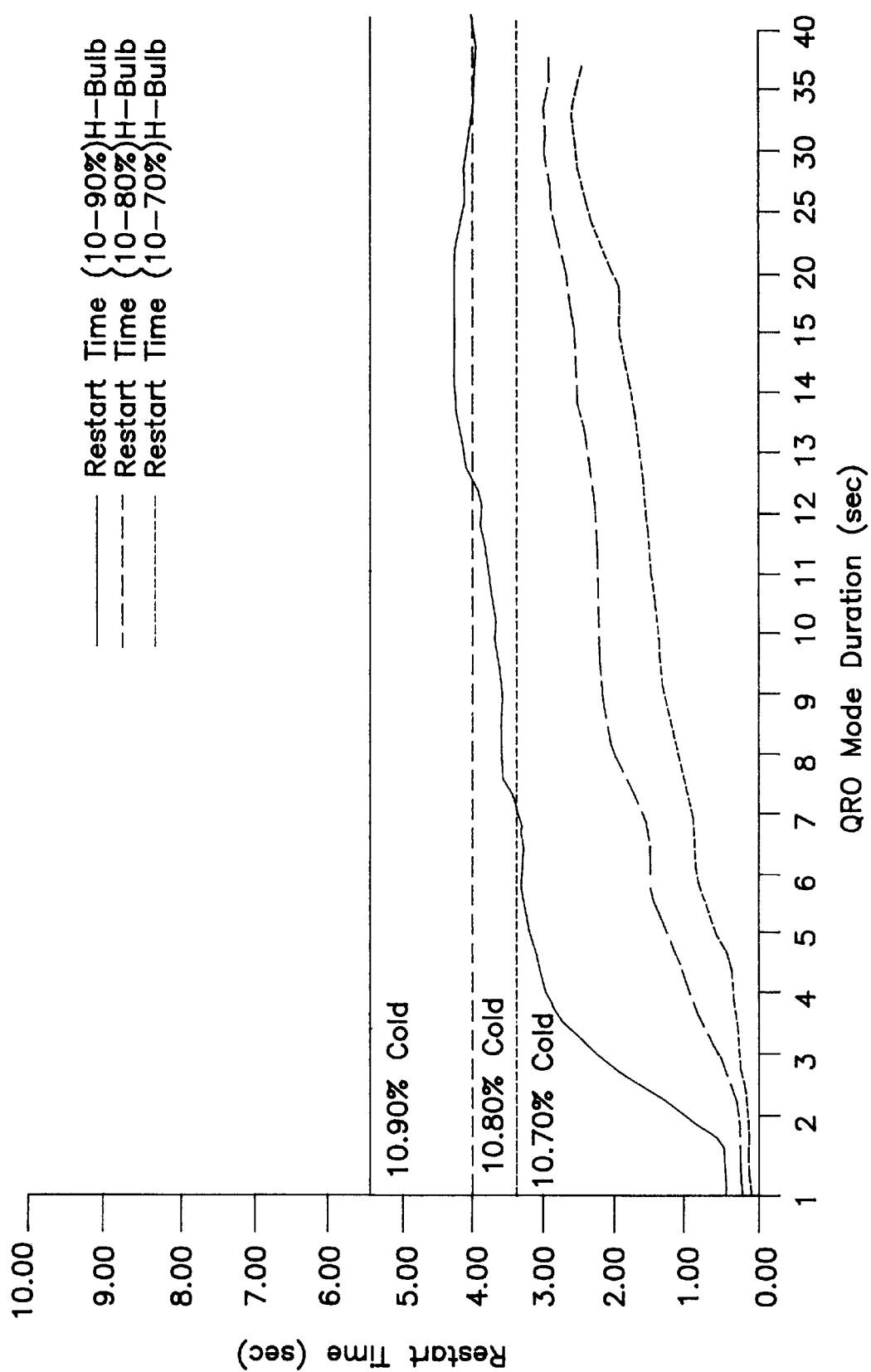
FIG. 5B shows another representative graphs of the restart time for the cold start, and the restart time versus the QRO mode duration for an H-type bulb (commercial designation of the assignee, Fusion Systems Corporation employed in curing applications.
Figure 5C:
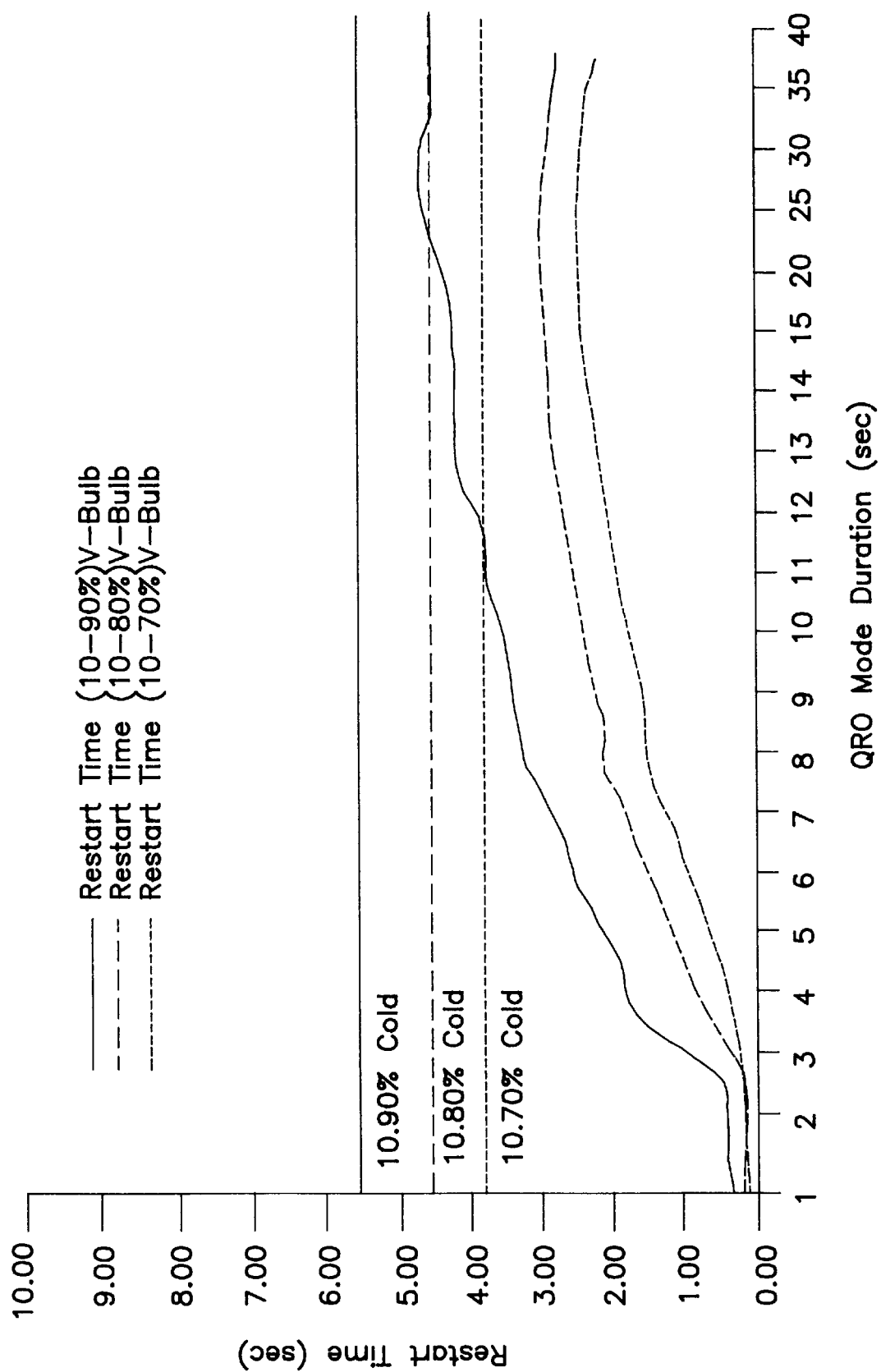
FIG. 5C shows still another representative graphs of the restart time for the cold start, and the restart time versus the QRO mode duration for a V-type bulb (commercial designation of the assignee, Fusion Systems Corporation) employed in curing applications.

Although the restart time depends on the type of a bulb, i.e., lamp fill, employed in heating or curing applications, other bulb types exhibit similar characteristics as the D-Bulb. FIGS. 5B and 5C show graphs for exemplary H-Bulb and V-Bulb, respectively (commercial designation of the assignee, Fusion Systems Corporation). As shown in FIGS. 5B and 5C, a shorter start-up delay and faster rise time to nearly the full power occur as a result of the QRO mode employed with those, as well as other, bulb types.

An alternative to the front panel switches 300, 322 is a remote operation. The remote operation using wires or cables to activate the ON/OFF and STANDBY signals correspond fully to the front panel switch operation without altering the operation of the power supply in accordance with the present invention as described above.

In accordance with one aspect of the present invention, the power supplying system provides simultaneous operation of two supplies, i.e., high power and low power, which in combination provide the normal, i.e., steady-state, operating current to the magnetron. One of the advantages associated with this arrangement resides in the fact that the switching between the two power supplies, i.e., activation and deactivation of the QRO mode, is seamless without any current lapse or current overlap. That is, there is no time period, regardless of how short or virtually instantaneous it might be, during which the magnetron current is fully interrupted or switched off completely when the QRO mode is activated or deactivated. Similarly, there is no time period, regardless of how short or virtually instantaneous it might be, during which the magnetron current is boosted above its normal level when the QRO mode is activated or deactivated.

In accordance with the above aspect, one embodiment of the present invention as described above may be replaced with a single, solid-state variable power supply. Thus, the solid-state variable power supply may replace the two ferro-resonant circuits which were described above. Upon selective activation of the QRO mode, the variable solid-state power supply will provide lower power by selectively reducing the output DC current while keeping the same high DC voltage. Similarly, upon selective activation of the full power mode from the QRO mode, the variable solid-state power supply will provide high power by increasing the output DC current while keeping the same high DC voltage.

Since those skilled in the art can modify the disclosed specific embodiment without departing from the spirit of the invention, it is intended that the claims be interpreted to cover such modifications and equivalents.

What is claimed is:

1. A power supplying system for an electrodeless lamp excited by a magnetron, comprising, a high power, power supply for supplying relatively high DC current and relatively high D.C. voltage to said magnetron, a low power, power supply for supplying relatively low DC current and substantially the same relatively high DC voltage to said magnetron, said high power and low power, power supplies being independent from each other and not utilizing any common components, means for utilizing both said high power, power supply and said low power, power supply and combining the currents therefrom for supply to said magnetron when said electrodeless lamp is operated in a full power mode, and means for disconnecting said high power, power supply from said magnetron when said electrodeless lamp is switched to a reduced power mode, while leaving said low power, power supply connected to said magnetron, whereby only said relatively low current from said low power, power supply continues to be fed to said magnetron in said reduced power mode, which is sufficient to enable said magnetron to generate enough microwave power to maintain said electrodeless lamp in an ignited condition to eliminate a cool down delay and enable quick restarting of said lamp when switched back to said full power mode.

2. The power supply system of claim 1 wherein said relatively low D.C. current bears such relationship to said relatively high D.C. current that in said reduced power mode the light output of said electrodeless lamp is a small percentage of what it is in the full power mode.

3. The power supply system of claim 2 wherein said low power, power supply includes inductor means for preventing said magnetron current from falling beneath a predetermined threshold level.

4. The power supply system of claim 2 wherein said means for disconnecting said high power, power supply comprises microcontroller means.

5. The power supply system of claim 2 wherein each of said high power, power supply and said low power, power supply include ferro-resonant transformer means connected to voltage multiplier means.

\* \* \* \* \*

UNITED STATES PATENT AND TRADEMARK OFFICE
CERTIFICATE OF CORRECTION

PATENT NO. : 5,838,114
DATED : November 17, 1998
INVENTOR(S) : PENZENSTADLER et al.

It is certified that error appears in the above-identified patent and that said Letters Patent is hereby corrected as shown below:

On the cover page, item [54], change the title to
-- MAGNETRON POWER SUPPLY INCORPORATING INDEPENDENT, PLURAL FERRO-RESONANT POWER SUPPLIES NOT UTILIZING COMMON COMPONENTS --

Signed and Sealed this

Nineteenth Day of October, 1999

Attest:

Attesting Officer

Q. TODD DICKINSON

Acting Commissioner of Patents and Trademarks